(12) United States Patent
Klassen et al.

(10) Patent No.: US 6,525,741 B1
(45) Date of Patent: Feb. 25, 2003

(54) CHROMA KEY OF ANTIALIASED IMAGES

(75) Inventors: R. Victor Klassen; Steven J. Harrington, both of Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/386,014

(22) Filed: Aug. 30, 1999

(51) Int. Cl.⁷ .......................... G09G 5/00; G06T 11/00; H04N 1/387
(52) U.S. Cl. ................ 345/589; 345/614; 345/640; 345/660; 345/591; 345/592; 348/586; 348/592; 348/584; 382/199; 382/299
(58) Field of Search ................. 345/660, 618, 345/640, 588, 589, 591–592, 611–614, 619; 348/586, 585, 587, 589, 590, 591, 592, 597–600, 650, 584; 382/163, 162, 167, 103, 106, 199, 295, 282, 212–214, 298, 299

(56) References Cited

U.S. PATENT DOCUMENTS

| | | | |
|---|---|---|---|
| 3,595,987 A | | 7/1971 | Vlahos ............... 178/5.2 R |
| 4,100,569 A | | 7/1978 | Vlahos ............... 358/22 |
| 4,344,085 A | | 8/1982 | Vlahos ............... 358/22 |
| 4,409,611 A | | 10/1983 | Vlahos ............... 358/22 |
| 4,488,169 A | * | 12/1984 | Yamamoto ............... 358/22 |
| 4,589,013 A | * | 5/1986 | Vlahos ............... 358/22 |
| 4,625,231 A | | 11/1986 | Vlahos ............... 358/22 |
| 5,267,328 A | * | 11/1993 | Gouge ............... 382/16 |
| 5,469,536 A | * | 11/1995 | Blank ............... 395/131 |
| 5,701,365 A | * | 12/1997 | Harrington ............... 382/212 |
| 5,808,674 A | * | 9/1998 | Adams, Jr. ............... 348/273 |
| 5,907,315 A | * | 5/1999 | Vlahos ............... 345/114 |
| 5,923,791 A | * | 7/1999 | Hanna ............... 382/295 |
| 5,977,977 A | * | 11/1999 | Kajiya ............... 345/418 |
| 6,122,013 A | * | 9/2000 | Tamir ............... 348/587 |
| 6,134,346 A | * | 10/2000 | Berman ............... 382/163 |

FOREIGN PATENT DOCUMENTS

| | | | | |
|---|---|---|---|---|
| EP | 0070174 | * | 1/1983 | .......... H04N/9/539 |
| WO | 84/05007 | * | 12/1984 | ............ H04N/5/22 |

* cited by examiner

Primary Examiner—Matthew Luu
Assistant Examiner—Wesner Sajous
(74) Attorney, Agent, or Firm—Fay, Sharpe, Fagan, Minnich & McKee, LLP

(57) ABSTRACT

A method of combining a foreground image and a background image includes scaling up a pixel of interest, which is positioned along an edge between a subject and a key colored backing, into a plurality of edge subpixels. The pixel of interest is included in a digital antialiased foreground image. A corresponding pixel of a digital background scene is also scaled up. The corresponding pixel is associated with the pixel of interest and is scaled up into a plurality of background subpixels. For each of the edge subpixels, if a color of the edge subpixel matches the key colored backing, a respective new color of the edge subpixel is determined as a function of one of the background subpixels, which is associated with the edge subpixel. Also, the new color is stored to the edge subpixel. After all the subpixels have been evaluated, the edge subpixels are scaled down to a new pixel of interest.

20 Claims, 3 Drawing Sheets

CHROMA KEY OF ANTIALIASED IMAGES

BACKGROUND OF THE INVENTION

The present invention relates to combining an antialiased foreground image with a background image. It finds particular application in conjunction with combining the images using a chroma key, and will be described with particular reference thereto. It will be appreciated, however, that the invention is also amenable to other like applications.

The concept of inserting a person or subject into a background scene to form a composite image has been practiced in the motion picture industry as far back as the 1930's. bver the years, improvements have been made in image compositing. However, it is a complex and difficult process.

In the motion picture industry, the foreground and background scenes are photographed on film. The film is subsequently scanned to produce high definition red-green-blue ("RGB") signals for computer assisted image compositing. In the compositing process, the colored backing is replaced with a background scene so that the foreground subject and the background scene appear as a single image.

A chroma-key method of compositing video images for television switches between a foreground subject, which is placed before a constant colored (commonly blue) backing, and a background scene, which is based on the presence or absence of the hue of the backing. Today's chroma-key systems (even with a soft edge) still switch between the foreground and background scenes.

Either-or selection is satisfactory for television newscasts when the subject is opaque and has well-defined edges. However, it is less satisfactory for television, and is totally unacceptable for motion pictures, when the subject includes loose hair, fog, smoke, motion blur, glassware, window reflections, out-of-focus objects, and other semi-transparent subjects. In these subjects, both the foreground and background elements occupy the same area and, therefore, there is no appropriate place to switch.

To properly reproduce these semi-transparent areas requires a "mixing" concept as opposed to the "either-or" concept of a switch. Composite methods based upon the "mixing" concept do not switch between the foreground and background scenes. Instead, the background scene is added to the foreground scene as a linear function of the luminance and visibility of the colored backing. The colored backing is removed by subtraction.

Until now, chroma-key has most commonly been an analog process, if the foreground image is a natural image, and a digital process if the foreground image is a synthetic image. In the synthetic case it is common to compute a separate coverage mask indicating which pixels are in the foreground and which are in the background, with intermediate values in the mask for pixels that are partially covered by the foreground. When the image is not computer generated, this approach is not available unless the mask is somehow computed as a separate step. In either case, the normal practice for digital compositing is to linearly blend the foreground pixel colors with the background pixel colors when computing new pixels along the edge, with the blending coefficient being given by the coverage. This may lead to artifacts when the background image contains structure that is partially covered by the foreground portion of the pixel of interest.

The present invention provides a new and improved apparatus and method which overcome the above-referenced problems and others.

SUMMARY OF THE INVENTION

A foreground scene is composited with a background scene by evaluating each of a plurality of foreground pixels in the foreground scene. For each of the foreground pixels, a determination is made if the foreground pixel is included within an edge between a subject and a backing in the foreground scene. The backing includes a key color. If the foreground pixel is included within the edge, the foreground pixel is scaled up into a plurality of foreground subpixels. A background pixel, at a corresponding location in the background scene, is scaled up into a plurality of background subpixels. A determination is made, for each of the foreground subpixels, if a color of the foreground subpixel matches the key color. If the foreground subpixel matches the key color, the foreground subpixel is replaced with a corresponding background subpixel. After determining if each of the foreground subpixels matches the key color, the foreground subpixels are scaled down to a corresponding new foreground pixel.

In accordance with one aspect of the invention, if the foreground pixel is not included within the edge, a determination is made if a color of the foreground pixel is the key color. If the color of the foreground pixel is the key color, the foreground pixel is replaced with a corresponding background pixel for forming the corresponding new foreground pixel.

In accordance with a more limited aspect of the invention, if the foreground pixel has been replaced, the new corresponding foreground pixel is written to a composite scene stored in a memory. If the foreground pixel has not been replaced, the foreground pixel is written to the composite scene in the memory.

In accordance with an even more limited aspect of the invention, the composite scene is output to a color output device.

In accordance with another aspect of the invention, the foreground subpixels are scaled down by determining an average color of the foreground subpixels. The new foreground pixel is created to include the average color.

In accordance with another aspect of the invention, the determination of whether the foreground pixel is included within the edge includes identifying a neighborhood of pixels including the foreground pixel.

In accordance with another aspect of the invention, the foreground and background pixels are scaled up to a same scale.

One advantage of the present invention is that it provides a chroma-key technique suitable for use with digital images.

Another advantage of the present invention is that it provides a smooth edge around antialiased objects in a foreground image that is composited with a background image using a chroma-key technique.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1A:
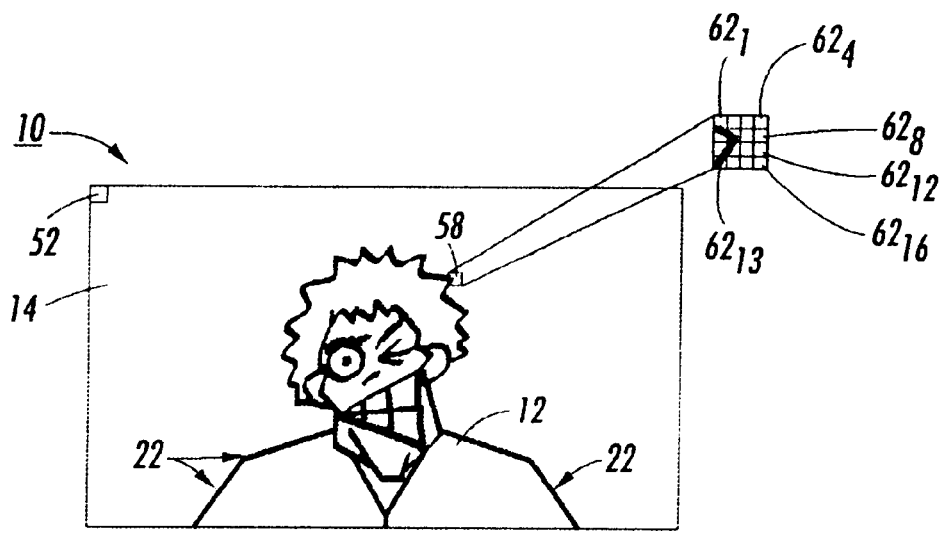
FIG. 1A illustrates a foreground image.
Figure 1B:
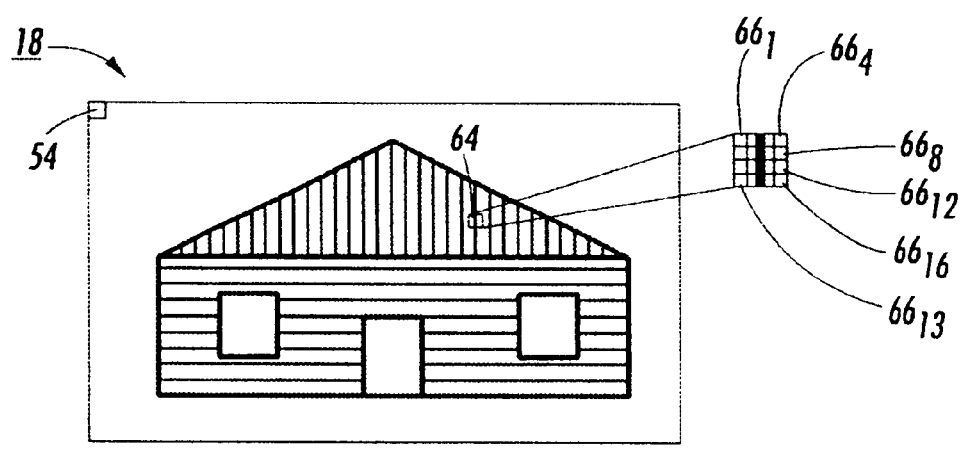
FIG. 1B illustrates a background image.

FIG. 1A illustrates a foreground image 10, which includes a subject 12 in front of a key colored (e.g., blue) backing 14. FIG. 1B illustrates a background image 18. Preferably, the foreground and background images 10, 18 shown in FIGS. 1A and 1B, respectively, are digital images, which include a plurality of pixels. Furthermore, because good quality digital images typically include edges that have been antialiased, an edge 22 between the subject 12 and the key colored backing 14 in the foreground image 10 is preferably antialiased.

Figure 2:
FIG. 2 illustrates a composite image of the foreground and background images of FIGS. 1A and 1B, respectively.

FIG. 2 illustrates a composite image 28 created from the foreground and background images 10, 18, respectively, of FIGS. 1A and 1B. The composite image 28 is created according to the apparatus and method of the present invention. To create the composite image 28 of FIG. 2, the key colored backing 14 of the foreground image 10 illustrated in FIG. 1A is replaced with corresponding areas in the background image 18 illustrated in FIG. 1B. More specifically, each pixel of the foreground image is evaluated to determine if the color of the foreground pixel matches the key colored backing. If the colors match, the pixel in the foreground image is replaced with a corresponding pixel in the background image. The corresponding pixel is located at a same location relative to the edges of the background image as the pixel to be replaced in the foreground image.

Figure 3:
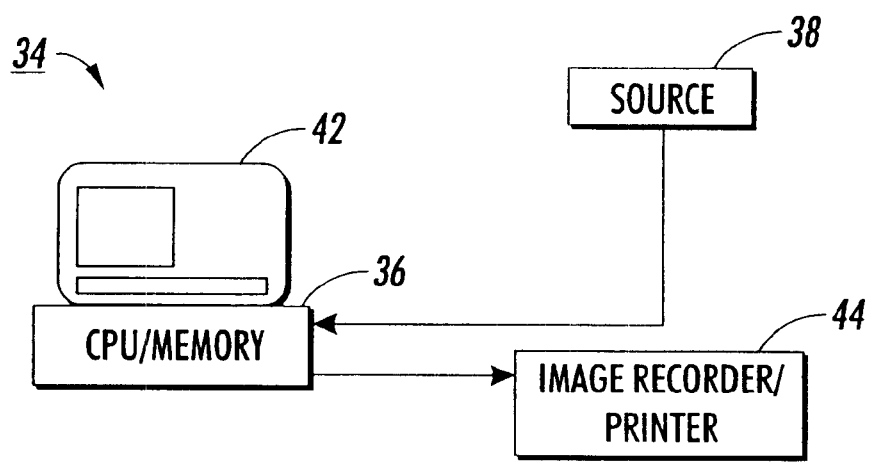
FIG. 3 illustrates a system for compositing images according to the present invention.

With reference to FIGS. 1A, 1B, and 3, a system 34 for compositing images according to the present invention includes a central processing unit ("CPU") and memory 36. The foreground and background images 10, 18, respectively, are transferred to the CPU and memory 36 via a source device 38 (e.g., a scanning device). The composite image 28 (see FIG. 2) is created by combining the foreground and background images 10, 18, respectively, using software executed within the CPU 36.

A display 42 communicates with the CPU 36. The display 42 is used for viewing images (e.g., the foreground image, the background image, and/or the composite image). An output device 44 (e.g., an image recorder/printer), which also communicates with the CPU 36, is used for producing a record of the composite image 28 (see FIG. 2). In the preferred embodiment, the output device 44 is a digital color printing device. However, it is also contemplated that the output device 44 be a color facsimile machine, a black-and-white printing device or facsimile machine, a video display device, or other device capable of recording and storing an image such as magnetic storage devices, compact disk storage, flash memory or the like.

Figure 4:
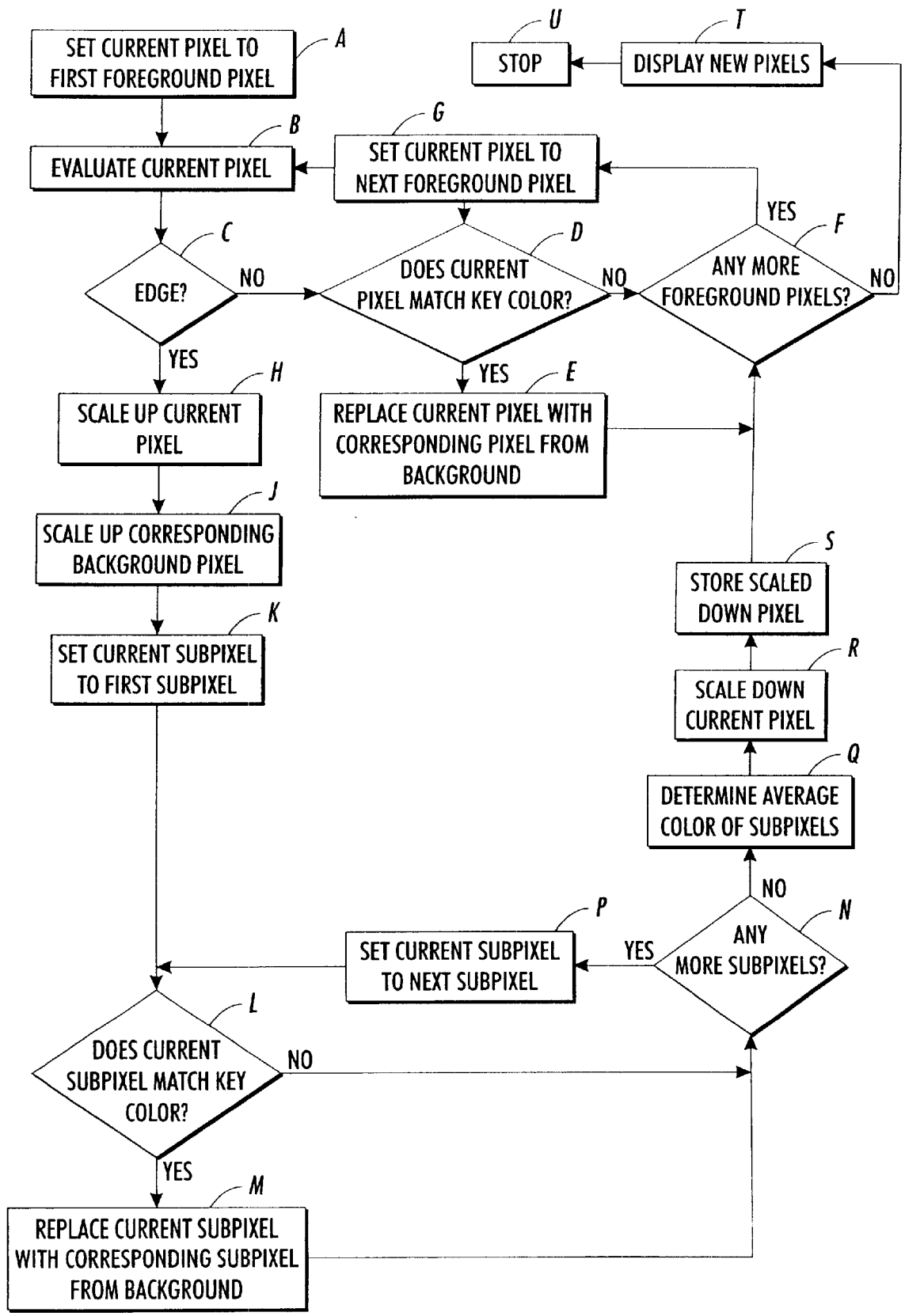
FIG. 4 illustrates a flowchart of the steps for compositing images according to the present invention.

A typical sequence for compositing the foreground and background images according to the present invention is illustrated in FIG. 4.

With reference to FIGS. 1A, 1B, and 2–4, each pixel in the foreground image 10 is evaluated to identify if it is contained within subject 12, the key colored backing 14, or an edge 22 between the subject 12 and the key colored backing 14. More specifically, neighborhoods of pixels within the foreground image, including a current pixel of interest, are evaluated according to the method disclosed in U.S. Ser. No. 09/097,092 ("the '092 application"), filed Jun. 11, 1998, which is hereby incorporated by reference in its entirety.

To accomplish this evaluation, a first pixel 52 in the foreground image 10 is set as a current pixel of interest in a step A. It is to be noted that the size of the pixels in the foreground and background images 10, 18, respectively, have been exaggerated and magnified for purposes of illustrating the present invention. In the preferred embodiment, the current pixel of interest is evaluated in a step B. A determination is made in a step C whether the current pixel of interest is included along the edge 22 between the subject 12 and the key colored backing 14. Preferably, the step C determines if an edge is present using the method disclosed in the '092 application. However, it is to be understood that other embodiments, which use different methods for evaluating the pixel and determining whether the pixel is included within an edge, are also contemplated.

If the current pixel of interest is not included along an edge, a determination is made in a step D whether the color of the current pixel of interest matches the key colored backing 14. If the colors match, the current pixel of interest in the foreground image 10 is replaced with a corresponding pixel from the background image 18 in a step E. For example, if the first pixel 52 (which is assumed to match the key colored backing 14) is the current pixel of interest, the first pixel 52 is replaced with the corresponding pixel 54 from the background image 18.

Then, after the step E, or after it is determined in the step D that the colors do not match, a determination is made in a step F as to whether any pixels, which have not yet been evaluated, remain in the foreground image 10. If more pixels remain to be evaluated in the foreground image 10, the next pixel in the foreground image 10 is set as the current pixel in a step G. Control is then returned to the step B, where that current pixel is evaluated.

If the foreground image 10 is antialiased, a better composite picture is obtained along the edge 22 by scaling up pixels corresponding to the edge 22 in both images 10, 18 before the replacement is made. Then, for those regions in the foreground image 10 that include the edge 22, it is determined which subpixels in the foreground image 10 are to be preserved and which are to be replaced by corresponding subpixels in the background image 18. Importantly, the replacement is performed for the scaled up pixels.

Therefore, if it is determined in the step C that the current pixel of interest is included along the edge 22, that pixel is scaled up in a step H. For purposes of illustration, a pixel of interest 58 is shown along the edge 22. Preferably, the pixel 58 is scaled up into a group of 4×4 (i.e., sixteen) subpixels $62_1, 62_2, \ldots 62_{16}$ according to the appropriate method identified in the '092 application. However, other scaling dimensions (e.g., a group of 5×5 subpixels) and/or methods for scaling up the pixel of interest are also contemplated.

A pixel 64 in the background image 18, which is positioned in a location corresponding to the location of the pixel of interest in the foreground image 10, is similarly scaled up, in a step J. The corresponding background pixel 64 is scaled up into the same number of subpixels $66_1, 66_2, \ldots 66_{16}$ (i.e., the same scale or magnitude) into which the current foreground pixel of interest was scaled (e.g., 4×4 subpixels). Preferably, the scaling method disclosed in the '092 application is also used to scale up the corresponding background pixel 64. However, other methods for scaling up the corresponding background pixel 64 are also contemplated.

Then, a first subpixel $62_1$ in the current pixel 58 of the foreground image 10 is set as a current subpixel of interest in a step K. A determination is made in a step L if the color of the current subpixel of interest matches the key color of the backing 14.

If the color of the current subpixel matches the key color, the current subpixel is replaced with a corresponding subpixel from the background image in a step M. In the example illustrated by the subpixels $62_1, 62_2, \ldots 62_{16}$, the subpixels $62_1, 62_2, 62_5, 62_6, 62_9, 62_{10}, 62_{13}$, and $62_{14}$ do not match the key colored backing 14. Therefore, the subpixels $62_1, 62_2, 62_5, 62_6, 62_9, 62_{10}, 62_{13}$, and $62_{14}$ are not replaced by corresponding subpixels $66_1, 66_2, 66_5, 66_6, 66_9, 66_{10}, 66_{13}$, and $66_{14}$ in the background image. On the other hand, the subpixels $62_3, 62_4, 62_7, 62_8, 62_{11}, 62_{12}, 62_{15}$, and $62_{16}$ do match the key colored backing 14. Therefore, the subpixels $62_3, 62_4, 62_7, 62_8, 62_{11}, 62_{12}, 62_{15}$, and $62_{16}$ are replaced by corresponding subpixels $66_3, 66_4, 66_7, 66_8, 66_{11}, 66_{12}, 66_{15}$, and $66_{16}$ in the background image.

It is to be understood that corresponding pixels and subpixels are located at corresponding locations within the respective images.

After the replacement is performed in the step M, or after it is determined in step L that the color of the current subpixel does not match the key color, a determination is made in a step N if any subpixels remain to be evaluated. If the step N determines that there are more subpixels to evaluate, the next subpixel is set as the current subpixel in a step P. Then, control is returned to the step L for further processing.

If the step N determines that there are not any more subpixels to evaluate, the average color of the subpixels is determined in a step Q. The subpixels are scaled down to the average color in a step R. Then, the scaled down pixel is stored in the memory 36 in a step S. Control is then returned to the step F to determine whether any pixels have not yet been processed.

As discussed above, if more pixels remain to be evaluated, control is returned to the step G where the current pixel is set as the next pixel to be evaluated. Then, control is returned to the step B for further processing.

If it is determined in the step F that all the pixels in the foreground image have been evaluated, the processed pixels are shown in the display 42 and/or output to the printing device 44 in a step T. The process is then stopped in a step U.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

The preferred embodiment having been thus described, the invention is now claimed to be:

1. A method of compositing a foreground scene and a background scene, comprising:
   evaluating each of a plurality of foreground pixels in the foreground scene;
   for each of the foreground pixels, determining if the foreground pixel is included within an edge between a subject and a backing in the foreground scene, the backing including a key color; and
   if the foreground pixel is included within the edge:
   scaling up the foreground pixel into a plurality of foreground subpixels;
   scaling up a background pixel, at a corresponding location in the background scene, into a plurality of background subpixels;
   for each of the foreground subpixels, determining if a color of the foreground subpixel matches the key color;
   if the foreground subpixel matches the key color, replacing the foreground subpixel with a corresponding background subpixel; and
   after determining if each of the foreground subpixels matches the key color, scaling down the foreground subpixels to a corresponding new foreground pixel.

2. The method of compositing a foreground scene and a background scene as set forth in claim 1, further including, if the foreground pixel is not included within the edge:
   determining if a color of the foreground pixel is the key color; and
   if the color of the foreground pixel is the key color, replacing the foreground pixel with a corresponding background pixel for forming the corresponding new foreground pixel.

3. The method of compositing a foreground scene and a background scene as set forth in claim 2, further including:
   if the foreground pixel has been replaced, writing the new corresponding foreground pixel to a composite scene stored in a memory; and
   if the foreground pixel has not been replaced, writing the foreground pixel to the composite scene in the memory.

4. The method of compositing a foreground scene and a background scene as set forth in claim 3, further including:
   outputting the composite scene to a color output device.

5. The method of compositing a foreground scene and a background scene as set forth in claim 1, wherein the step of scaling down the foreground subpixels includes:
   determining an average color of the foreground subpixels; and
   creating the new foreground pixel, the new foreground pixel including the average color.

6. The method of compositing a foreground scene and a background scene as set forth in claim 1, wherein the step of determining if the foreground pixel is included within the edge includes:
   identifying a neighborhood of pixels including the foreground pixel.

7. The method of compositing a foreground scene and a background scene as set forth in claim 1, wherein the steps of scaling up the foreground and background pixels include:
   scaling up the foreground and background pixels to a same scale.

8. A method of combining a foreground image and a background image, comprising:
   scaling up a pixel of interest, positioned along an edge between a subject and a key colored backing, into a plurality of edge subpixels, the pixel of interest being included in a digital antialiased foreground image;
   scaling up a corresponding pixel of a digital background scene, the corresponding pixel being associated with the pixel of interest and being scaled up into a plurality of background subpixels;
   for each of the edge subpixels, if a color of the edge subpixel matches the key colored backing:
   determining a respective new color of the edge subpixel as a function of one of the background subpixels, the background subpixel being associated with the edge subpixel; and storing the new color to the edge subpixel; and scaling down the edge subpixels to a new pixel of interest.

9. The method of combining a foreground image and a background image as set forth in claim 8, further including:

before the step of scaling up the pixel of interest, determining if the pixel of interest is included along the edge.

10. The method of combining a foreground image and a background image as set forth in claim 9, wherein the step of determining if the pixel of interest is included along the edge includes:

evaluating a neighborhood of pixels including the pixel of interest.

11. The method of combining a foreground image and a background image as set forth in claim 8, further including:

associating the corresponding pixel of the background scene with the pixel of interest as a function of the locations of the pixel of interest and the corresponding pixel within the foreground scene and the background scene, respectively.

12. The method of combining a foreground image and a background image as set forth in claim 8, further including:

associating the background subpixel with the edge subpixel as a function of the respective locations of the subpixels within the plurality of subpixels.

13. The method of combining a foreground image and a background image as set forth in claim 8, wherein the steps of scaling up include:

scaling up the pixel of interest and the corresponding pixel to a same magnitude.

14. The method of combining a foreground image and a background image as set forth in claim 8, further including:

outputting the new pixel of interest to a digital printing device.

15. The method of combining a foreground image and a background image as set forth in claim 8, further including:

outputting the new pixel of interest to a video display device.

16. A system for compositing images, comprising:

a memory device for storing a background image and a foreground image, including a subject and a backing having a key color, an edge being defined between the subject and the backing; and a central processing unit ("CPU") receiving the foreground and background images from the memory device, the CPU evaluating each of a plurality of foreground pixels in the foreground image and determining if the foreground pixel is included within the edge, if the foreground pixel is included within the edge, the CPU scaling up the foreground pixel into a plurality of foreground subpixels and scaling up a background pixel, at a corresponding location in the background scene, into a plurality of background subpixels, the CPU determining, for each of the foreground subpixels, if a color of the foreground subpixel matches the key color, if the foreground subpixel matches the key color, the CPU replacing the foreground subpixel with a corresponding background subpixel, and after determining if each of the foreground subpixels matches the key color, the CPU scaling down the foreground subpixels to a corresponding new foreground pixel.

17. The system for compositing images as set forth in claim 16, further including:

a source device for inputting the foreground and background images to the memory device.

18. The system for compositing images as set forth in claim 16, further including:

an output device, connected to the memory device and the CPU, for at least one of recording and displaying the new foreground pixels.

19. The system for compositing images as set forth in claim 18, wherein the output device is a digital color printing device.

20. The system for compositing images as set forth in claim 16, wherein the CPU determines a color of the new foreground pixel as a function of an average color of the foreground subpixels.

* * * * *